United States Patent [19]

Steinberg et al.

[11] 4,238,266
[45] Dec. 9, 1980

[54] PROCESS OF FORMING A GLASS FIBER REINFORCED, STAMPABLE THERMOPLASTIC LAMINATE

[75] Inventors: Albert H. Steinberg, Morris Plains; Lowell G. Ward, Mendham, both of N.J.

[73] Assignee: Allied Chemical Corporation, Morris Township, Morris County, N.J.

[21] Appl. No.: 1,664

[22] Filed: Jan. 8, 1979

Related U.S. Application Data

[63] Continuation of Ser. No. 817,070, Jul. 19, 1977, abandoned.

[51] Int. Cl.³ .............................................. B29D 7/02
[52] U.S. Cl. ............................... 156/243; 156/244.11; 156/244.27
[58] Field of Search ............. 156/243, 244.11, 244.27, 156/500; 428/283, 284, 285, 288, 292, 293, 294, 295, 297, 298, 302, 323, 409; 264/176 R, 257, 258

[56] References Cited

U.S. PATENT DOCUMENTS

| | | | |
|---|---|---|---|
| 3,765,998 | 10/1973 | Oswald et al. | 156/244.11 |
| 3,788,923 | 1/1974 | Soliman | 156/244.11 |
| 3,798,103 | 3/1974 | Gaunt | 156/244.11 |
| 3,882,219 | 5/1975 | Wiley | 156/244.11 |
| 4,044,188 | 8/1977 | Segal | 156/244.11 |

Primary Examiner—Caleb Weston
Attorney, Agent, or Firm—Richard A. Negin; Henry E. Naylor

[57] ABSTRACT

Glass fiber reinforced thermoplastic laminate is formed by extruding first and second sheets of thermoplastic resin containing glass fibers. A layer of glass fibers is applied to one side of the first sheet. The second sheet is laminated to the first sheet and the layer of glass fiber at a temperature ranging from the melting point of the thermoplastic resin to about 650° F.

8 Claims, 1 Drawing Figure

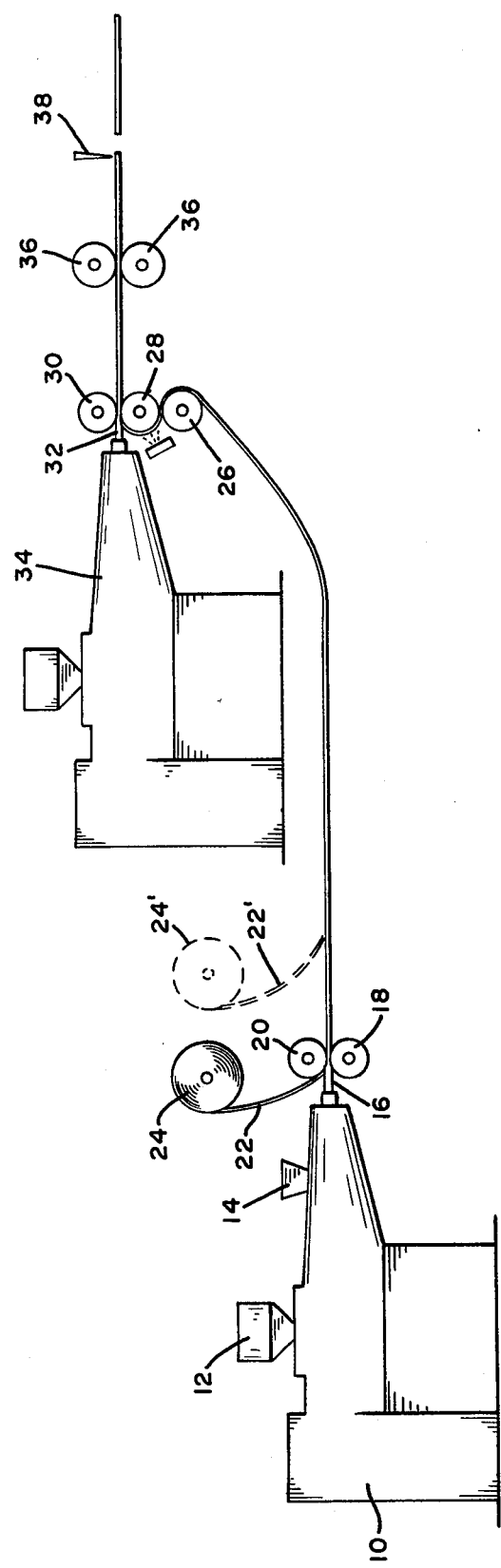

PROCESS OF FORMING A GLASS FIBER REINFORCED, STAMPABLE THERMOPLASTIC LAMINATE

This is a continuation of application Ser. No. 817,070 filed July 19, 1977, now abandoned.

FIELD OF THE INVENTION

This invention relates to a process of forming a glass fiber reinforced, stampable thermoplastic laminate.

DESCRIPTION OF THE PRIOR ART

It has been proposed to form glass fiber reinforced thermoplastic laminates and shape the same by stamping or other techniques into structural or decorative parts for incorporation into automotive bodies and the like. Such laminates include a layer of thermoplastic resin, e.g., nylon 6, including a mineral filler, a layer of glass fabric which can be in the form of a nonwoven mat of fibers, a veil of such fibers or a woven fabric and a second layer of thermoplastic resin. It has previously been proposed to form such laminates by a process which includes laying up by hand the three separate lamina and compression molding at elevated temperature until a laminate is formed. Such a process has its disadvantages, such as being a basically batch process, requiring large molding equipment and providing laminates having a surface not suitable for decorative applications.

SUMMARY OF THE INVENTION

In accordance with this invention, a process of forming a glass fiber-reinforced, stampable thermoplastic laminate is provided, which process consists essentially of the steps of continuously extruding a first sheet of thermoplastic resin containing about 5 to 35% by weight glass fibers on an extruded basis, continuously embedding a layer of glass fibers into one surface of said first sheet, continuously extruding a second sheet of thermoplastic resin containing about 5 to 30% by weight of glass fibers on an extruded basis and continuously laminating said second sheet to said first sheet and said layer of glass fibers thereinbetween without impairing the integrity of or rearranging the glass fibers of the first and second sheets, the lamination being conducted at a temperature ranging from the melting point of the thermoplastic resin to about 650° F. More specifically, the process consists essentially of the steps of continuously extruding a first sheet of nylon 6 resin containing about 10 to 35% by weight glass fibers on an extruded basis, continuously advancing said sheet to a pair of nip rolls maintained at a temperature of about 250° to 350° F., continuously feeding the layer of glass fibers to said nip, continuously embedding said layer of glass fibers into one surface of said first sheet to form a prelaminate, continuously advancing said prelaminate to a lamination zone comprising a set of adjacent rollers forming a nip, continuously extruding said second sheet and advancing the same between the nip of said rolls, and continuously laminating said second sheet to said first sheet and said layer of glass fibers without impairing the integrity of or rearranging the glass fibers of the first and second sheets, the lamination being conducted at a temperature in the range of about 450° to 550° F.

BRIEF DESCRIPTION OF THE DRAWINGS

The sole FIGURE is a schematic view of the process of the invention.

DESCRIPTION OF THE PREFERRED EMBODIMENTS

The process of this invention is particularly amenable for forming laminates of thermoplastic sheets comprising nylon 6 resin (the polymerization product of ε-aminocaproic acid or caprolactam), glass fiber and mineral fillers and a centrally disposed layer of glass fiber impregnated by the resinous matrix. A first of the sheets contains a minimum of about 5% by weight based on the total weight of the extruded sheet of glass fiber. A second of the sheets contains a minimum of about 5% by weight based on the total weight of the extruded sheet of glass fiber. The presence of glass fiber reduces sagging of the sheet while it is being transported in this process, reduces feeding problems in the extruder caused by aggregation of mineral filler in the mix and also acts as a reinforcing agent. Preferably, the glass fiber is present in a first of the sheets in an amount of about 20 to 30 weight percent, and in a second of the sheets in an amount of about 15 to 25 weight percent. Above the maximum amounts, extrusion and lamination of the sheet becomes increasingly difficult to accomplish. The glass fiber may be of any suitable length, ranging from chopped fiber of 1/16 inch or less to continuous filaments since the fiber length is reduced in the extruder. The glass fiber is preferably in the form of glass strands comprised of about 2 to 400, preferably 5 to 120, filaments per strand. Each filament is about 0.00030 to about 0.001 inch, preferably 0.00035 to 0.00085 inch, in diameter. The glass may be of any conventional type, such as E-glass. The glass fiber may also be coated with a coupling agent.

Each of the sheets can include a particulate mineral filler which reduces cost and improves the flexural and tensile modulus of the sheets and is present in an amount of about 5 to 35% by weight of the extruded sheet, preferably 15 to 30% and more preferably 20 to 25%. As mineral fillers, there can be employed those fillers that are suitable for incorporation into plastic materials, such as minerals, metals, meetallic oxides, metallic salts, siliceous materials and the like and mixtures thereof. Exemplary of such fillers are clays such as kaolin and bentonite, novaculite and other forms of silica, glass beads, talc, feldspar, alumina, aluminum hydrates, calcium carbonate, quartz, garnet, mica, calcium oxide, calcium hydroxide, gypsum, wollastonite, and the like. These fillers may optionally be treated with various coupling agents or adhesion promoters as is known in the art. The preferred fillers include kaolin and glass beads.

With sheets formed of nylon 6 resin, it is preferred to utilize talc as a nucleating agent for the nylon. For this purpose about 0.5 to 1.5% or more talc by weight of the nylon is incorporated into the sheet. Preferably, the sheet contains about 1% talc based on the weight of the nylon. Other nucleating agents may alternatively be employed in similar amounts with nylon or other crystalline polymers.

Each of the sheets can be formed from compositions that include a coupling agent to improve the bond between the filler and/or glass fiber and the resin matrix. As coupling agents, there can be employed organosilane compounds such as halogenated or nonhalogenated vinyl and alkyl containing, alkylalkoxy, alkenyl, aminoalkyl, amonoalkoxy, acyloxy, alkenyl acyloxy and similar silanes, their hydrolysis products and polymers thereof. For example, compounds of the following compound may be employed:

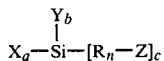

where x is a hydrolyzable group capable of reaction with a hydroxyl group, Y is hydrogen or a monovalent hydrocarbon group, R is an alkylene group of from 1 to 20 carbon atoms, Z is a group capable of reaction with a polyamide, n is an integer from 0 to 1, a is an integer from 1 to 3, b is an integer from 0 to 2, c is an integer from 1 to 3 and the sum of a+b+c equals 4. Compounds, of this nature are described in U.S. Pat. No. 3,419,517 to Hedrick et al. Exemplary of specific compounds which may be employed herein are aminopropyltriethoxysilane, vinyl triethoxysilane, vinyltri($\beta$-methoxy-ethoxy) silane and the like. The coupling agents are present in an amount of about 0.1 to 1.0% by weight of the total sheet, preferably 0.25 to 0.5%.

The thermoplastic sheet can be extruded utilizing any conventional screw extruder apparatus. It is preferred, however, to employ a vented extruder 10 in order to remove volatiles that are released by the components in the extruder. The extruder 10 includes a conventional feed throat 12 to which the components of the sheet are added. If desired, the components of the sheet may be added in pelletized form.

Preferably, the components are thoroughly blended together prior to being fed into the extruder. For this purpose, conventional mixing apparatus can be employed. Good results have been obtained utilizing a tumbling-type mixer. It is desirable to first blend the nylon 6 resin, which may be in pellet or powder form, with the coupling agent so that the latter wets the resin, then add the mineral filler and talc if employed as well as any colorants or pigments or other conventional additives, continue mixing, thereafter add the glass fibers and continue mixing for an additional time. The coupling aid, mineral filler and talc, as well as pigments, etc. are preferably blended in particulate form. Mixing may be performed at any suitable temperature but it is preferred to dry mix the components at about room temperature.

As an example of a typical mixing operation for a nylon 6 composition, nylon pellets and the coupling aid are mixed at room temperature in a tumbler for about 3 to 5 minutes, mineral filler and talc added and blending continued for about 5 to 10 minutes, the glass fibers added and blending continued for about an additional 1 to 3 minutes. Mixing times greater than 3 minutes in the final mixing step tend to agglomerate the fibers and hence should be avoided.

The blended composition is fed to the feed throat of a conventional extruder, such as a single or double barrel extruder, and the composition is extruded at a temperature above the melting point of the thermoplastic resin, that is, above about 425° F. and preferably in the range of about 450°–550° F. for nylon 6. The composition is extruded through the die head of the extruder in the form of a relatively thick sheet typically between about 50 and 300 mils thick. The sheet is passed between a pair of nip rolls 18, 20 which rotate at a faster surface rate of speed than the rate the sheet is fed to the nip. As a result, a sheet of the extruded composite is formed which has a reduced thickness in comparison with the thickness of the extrudate. Typically, the sheet may be of a thickness in the range of about 30 to 200 mils, preferably 40 to 120 mils. The "draw down ratio", that is, the ratio between the speed of the nip rolls and the speed of the extrudate fed thereto, should be in the range of about 1.5:1 to 3:1. Draw down ratios below about 1.5:1 tend to produce sheets of uneven flatness whereas ratios above about 3:1 can cause the sheet to tear.

The nip rolls are maintained at a surface temperature in the range of about up to about 350° F., preferably about 200 to 350° F. At temperatures above about 350° F. the nylon melt tends to adhere to the nip rolls, destroying the integrity of the sheet. The nip rolls are typically adjusted to exert a pressure of about 75 to 200 pounds per inch of sheet width, preferably about 100 to 150 pounds per inch of sheet width, in order to effectuate impregnation.

A layer 22 of glass fiber is laid upon one surface of the sheet prior to or concurrently with entrance of the sheet into the nip. The purpose of the layer of glass fibers is to provide rigidity and strength to the final product, and to facilitate handling of the composite laminate in the processing steps, particularly the steps of heating and transfer to the stamping press. This layer may be in the form of a woven or non-woven mat having continuous or finite lengths of glass fibers (i.e., strands or filaments) with or without sizing agents and/or binders. The glass mat is a porous, light weight material and typically has a thickness of between about 10 and 150 mils and a weight of about 0.1 to 5 ounces per square foot. The major contribution of glass fiber mats 0.1 to 0.25 ounces in weight and 10 to 70 mils thick, oftentimes referred to as surface veils, is in preventing sagging of the composite sheet during handling prior to and during the stamping operation. The glass fibers employed in the mat or veil may be formed of any suitable glass, preferably the commercial E-glass and the fibers typically are of a diameter in the range referred to previously with respect to the glass fiber of the sheet. The mat or veil is supplied in sheet form and may be wound in a roll 24 or provided in other configurations.

When the mat or veil is laid upon the sheet prior to or at the nip rolls, the mat or veil is bonded to and partially penetrates into one surface of the hot sheet. When the mat or veil 22 is alternatively laid upon the sheet after the latter has passed through the nip rolls 18, 20, for example by means of roll 24', it may merely be supported by the underlying sheet or it too may be penetrated into the sheet surface by means of a pressure roll coupled with a heat source capable of melting the sheet surfaces. The mat or veil 22, 22' shown schematically in FIG. 1 can be comprised of a plurality of mats or veils. Further, the mat or veil 22' can be laid upon a sheet to which a mat or veil 22 has been bonded.

The sheet with its overlying layer of glass fibers, herein referred to as "prelaminate", is advanced to a lamination zone where the second sheet of thermoplastic resin is applied over the layer of glass fibers and is bonded to the underlying layers. The temperature of the prelaminate advancing to the lamination zone is typically above room temperature and preferably above about 250° F. In order to maintain the temperature, there may be optionally employed an enclosed tunnel or the like through which the prelaminate advances or a series of heaters, such as infrared heaters, may be employed. Alternatively or in addition thereto, an optional heater, such as an infrared heater, may be positioned in the lamination zone.

The lamination zone comprises a plurality of heated rolls. Preferably, three such rolls are employed, arranged vertically in a set. The lower two rolls are maintained at a temperature below the melting point of the thermoplastic resin. The purpose of the first roll 26 is to reheat or maintain the temperature of the prelaminate. In use of nylon 6 resin, for example, the first roll should be maintained at a surface temperature in the range of about 250° to 420° F., preferably in the range of about 300 to 375° F. The first roll as well as the additional roll(s) may be heated by any conventional means, such as by circulating hot oil through the interior of the roll. In order to insure good heating of the prelaminate, it is preferably passed beneath and around the first roll so that it is in contact with the roll for approximately 120 to 225 degrees of roll circumference.

The prelaminate leaving the first roll contacts a second heated roll 28. The first and second rolls are adjusted to provide a pressure therebetween in the range of about 0 to 100 pounds per lineal inch (pli). The surface of the second roll 28 is maintained in the same range of temperatures as is that of nip rolls 18, 20. The prelaminate preferably contacts the second roll 28 for approximately 180 degrees of circumference and the prelaminate is positioned so that the layer of glass fibers faces away from the surface of the roll 28. This arrangement also permits such exposed surface of the prelaminate to be heated by means of an optional infrared or other type heater to a lamination temperature in the range of about 450°–550° F.

The prelaminate is thereafter passed between the second and third rolls 28 and 30 where a second sheet 32 of thermoplastic material is laminated thereto. This second sheet also preferably is formed of a nylon 6 composition, including glass fibers, mineral filler and nucleating aid in the amounts discussed with respect to the first sheet. The composition of the second sheet may be identical to or different than that of the first sheet. The second sheet is also formed by an extrusion process and for this purpose there may be utilized an extrusion apparatus 34 of the same type described with respect to the first sheet. Similar extrusion temperatures may be employed. The die head of the second extruder typically is spaced as close to the nip formed by the second and third rolls, as is possible while maintaining clearance between the peripheral surfaces of the rolls and the die head. A typical spacing of the die head from this nip of the second and third rolls is in the order of about 1 to 4 inches. The second extruder provides a hot extrudate typically of a thickness of about 50 to 300 mils. This extrudate is fed to the nip formed by the second and third rolls and is positioned so as to contact the surface of the prelaminate bearing the layer of glass fibers. Initial contact between the second sheet and the prelaminate may be made slightly before or in the nip.

As mentioned before, in the nip the second sheet is laminated to the prelaminate. The third roll is maintained at a surface temperature below about 350° F., preferably in the range of about 250° to 325° F. so that lamination is effectuated without undue loss of sheet temperature. The second and third rolls are positioned so that a pressure in the range of about 75 to 200 pli, preferably 100 to 150 pli is exerted therebetween. The second and third rolls are rotated at a faster surface speed than the second sheet is fed to the nip, so that the second sheet is "sheeted out" as well as laminated in the nip. For example, the second and third rolls may be rotated at a surface speed of 2 to 25 feet per minute and the second sheet extruded at a linear speed of 0.7 to 17 feet. The first, second, and third rolls are rotated at substantially the same surface speed.

The material passing out of the nip is in the form of a composite laminated sheet formed of two layers of nylon 6 or other thermoplastic and a glass fiber layer embedded therein. The intermediate glass fiber layer is desirably positioned at approximately the center of the laminate although it may be positioned closer to one surface of the laminate if so desired by forming the two sheets of different thicknesses. When laminated together, the two sheets form a matrix encasing the layer of glass fiber. Short fibers contained by the resin are randomly but predominately 2-dimensionally orientated in the plane of the sheet. The lamination does not substantially impair the integrity of or substantially rearrange the short fibers, with the result that more than fifty percent of the short fibers are aligned substantially parallel to the plane of the sheet. Such orientation of the short glass fibers is preferable for increasing sheet strength and achieving smooth-surface sheets. The composite sheet is thereafter advanced by a pair of pulling rolls 36 or the like which are rotated at a speed to provide a slight overall tension in the laminate. For example, the pulling rolls can be operated at a speed in the order of about 0.05 to 1% higher than the surface speed of the rolls of the preceding nip.

The composite sheets are thereafter cut by shear 38 or otherwise formed into blanks of desired size. Any conventional cutting arrangement may be employed, desirably one that travels with the moving laminate. If desired, the composite sheet may be cooled by air cooling or the like, prior to cutting.

The resultant laminate can be compression molded, stamped or otherwise shaped by application of heat and pressure. The composite sheet may be formed by a cold or hot stamping operation, that is, at sheet temperatures below or above the melting point. It has been found that cold or hot forming in metal stamping equipment provides acceptable stamped parts. Exemplary of the parts which can be stamped from the opposite sheets are automotive decorative and/or structural parts such as deck lids, fender extenders, oil pans, bumpers, headlight housings and the like.

The composite sheet can be stamped in line before or after the cutting step. It may be cooled or allowed to cool prior to stamping and packaging.

While the process of this invention has been described herein primarily in terms of manufacturing thermoplastic sheet containing glass fiber, it is clear that the process of the present invention can also be practiced using a variety of other fibrous materials, such as fibrous material composed of inorganic materials or organic materials having a melting point higher than that of the thermoplastic resin, such as fibrous material composed of asbestos, carbon, graphite, cellulose, mixtures thereof and the like, the fibrous material and the glass fibers being collectively present in an amount ranging from about 5 to 35 percent by weight on an extruded basis.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

A blend of 60% nylon, 30% short glass fibers and 10% mineral filler was fed to the hopper of single screw extruder 10. A blend of this composition was fed to the hopper of single screw extruder 34.

Each of the extruders 10, 34 was operated to produce a flat sheet measuring 0.150 inch at the lips of the sheet die. Extruder barrel temperatures ranged from 450°–480° F. at the first heating zone upward to 505°–520° F. at the exit zone. Die temperatures ranged from 495° to 530° F.

The extruded sheets were fed individually to calendars operating at surface speeds suitable to reduce the sheet thickness to ⅓ of that at the die lips. To the first of these two sheets was plied a single layer of light glass mat (veil) weighing approximately 3.3 g/square foot. Calender roll temperatures were maintained at 230°–250° F.

A second layer of veil was deposited onto the surface of the first sheet to which the first veil had been plied. The second of the sheets was extruded onto the veil from a die head located close to the nip of a pair of calender rolls 28, 30. The combined sheets and veils were fed into the nip and pressed by the squeezing action of the nip into a cohesive laminate. Calender roll temperatures used to laminate the combined sheets and veils ranged from about 250°–290° F. The resulting sheet was cut into discrete blanks, stored for several days and then stamped into automobile headlight covers.

EXAMPLE 2

A blend of 50% nylon, 30% short glass fibers and 20% mineral filler was fed to the hopper of single screw extruder 10. A blend of this composition was fed to the hopper of single screw extruder 34.

Each of the extruders 10, 34 was operated to produce a flat sheet measuring 0.150 inch at the lips of the sheet die. Extruder barrel temperatures ranged from 470°–475° F. at the first heating zone upward to 525°–530° F. at the exit zone. Die temperatures ranged from 518°–535° F.

The extruded sheets were fed individually to calenders operating at surface speeds suitable to reduce the sheet thickness to approximately ⅓ of that at the die lips. To the first of these two sheets was plied a single layer of mat composed of continuous glass fiber and weighing approximately 1 oz/square foot. Calender roll temperatures were maintained at 230°–250° F.

A second layer of mat was deposited onto the surface of the first sheet to which the mat had been plied. The second of the sheets was extruded onto the mat from a die head located close to the nip of a pair of calender rolls 28, 30. The combined sheets and mats were fed into the nip and pressed by the squeezing action of the nip into a cohesive laminate. The temperature of calender rolls 28, 30 was in the range of 250°–290° F. The resulting sheet was cut into discrete blanks, stored for several days and then stamped into retaining panels for automobile tail lights.

Although the above discussion has been directed primarily to nylon 6, it is to be understood that other thermoplastic polymers may be employed in the process of this invention. Such thermoplastic polymers include other polyamides, that is, polymers having regularly occurring amide groups as an integral part of their main polymer chain, such as nylon 6,6; linear polyester resins such as polyethylene terephthalate and polybutylene terephthalate; polyolefins such as polyethylene, polypropylene and polymethylpentene; polyurethanes; polysulfones; polycarbonates; cellulose ester resins such as cellulose nitrate, cellulose acetate and cellulose propionate; halogenated olefins and polyacetal resins and the like. Copolymers and/or blends of two or more of the polymeric materials may also be employed.

Having thus described the invention in rather full detail, it will be apparent that these details need not be strictly adhered to, but that various changes and modifications may suggest themselves to one skilled in the art, all falling within the scope of the invention as defined by the subjoined claims.

We claim:

1. A continuous process of forming a glass-fiber reinforced, stampable thermoplastic laminate consisting essentially of the steps of:
   (a) extruding a first sheet of thermoplastic resin containing about 5 to 35% by weight of glass fibers on an extruded basis;
   (b) embedding a layer of glass fibers into one side of said first sheet;
   (c) extruding a second sheet of thermoplastic resin containing about 5 to 35% by weight of glass fibers on an extruded basis; and
   (d) laminating, in a lamination zone, said second sheet to said first sheet and said layer of glass fibers without substantially impairing the integrity of or rearranging said glass fibers of said first and second sheets, wherein said lamination zone comprises a set of three heated rolls, said first sheet and said layer of glass fibers being in the form of a prelaminate and being passed serially around the first and second of said heated rolls and thence between the second and third rolls, advancing said second sheet to the nip formed by the second and third rolls and onto said prelaminate and laminating said prelaminate and said second sheet between the second and third rolls and wherein the lamination occurs at a temperature ranging from the melting point of the resin to about 650° F.

2. The process of claim 1 wherein said prelaminate is additionally heated during contact with said first and second rolls by means of an infrared heater before reaching said nip and said second and third rolls.

3. The process of claim 1 wherein said first sheet further comprises a particulate mineral filler.

4. The process of claim 3 wherein said second sheet further comprises a particulate filler.

5. The process of claim 1 wherein said thermoplastic resin is nylon 6 resin, said first sheet comprises by weight basis of the extruded sheet, 20 to 30% glass fiber, 5 to 35% mineral filler and 0.5 to 1.5% talc as a nucleating agent and said laminating step is conducted at a temperature in the range of about 450° to 550° F.

6. The process of claim 5 wherein said mineral filler comprises glass beads.

7. The process of claim 1 wherein the thermoplastic resin is nylon 6 and said second and third rolls are maintained at a maximum surface temperature of about 350° F.

8. The process of claim 7 wherein the first roll is maintained at a surface temperature below the melting point of the resin.

* * * * *